US009437215B2

(12) United States Patent
Conway et al.

(10) Patent No.: US 9,437,215 B2
(45) Date of Patent: *Sep. 6, 2016

(54) PREDICTIVE VIDEO ANALYTICS SYSTEM AND METHODS

(71) Applicant: MATTERSIGHT CORPORATION, Chicago, IL (US)

(72) Inventors: Kelly Conway, Lake Bluff, IL (US); Christopher Danson, Austin, TX (US)

(73) Assignee: Mattersight Corporation, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/996,913

(22) Filed: Jan. 15, 2016

(65) Prior Publication Data

US 2016/0133274 A1 May 12, 2016

Related U.S. Application Data

(63) Continuation of application No. 14/525,002, filed on Oct. 27, 2014, now Pat. No. 9,269,374.

(51) Int. Cl.
*G10L 21/00* (2013.01)
*G10L 25/63* (2013.01)
*G06K 9/00* (2006.01)
*G10L 17/22* (2013.01)
*G10L 17/26* (2013.01)

(52) U.S. Cl.
CPC .......... *G10L 25/63* (2013.01); *G06K 9/00302* (2013.01); *G10L 17/22* (2013.01); *G10L 17/26* (2013.01)

(58) Field of Classification Search
CPC .............................. G10L 25/63; G06Q 30/02
See application file for complete search history.

(56) References Cited

U.S. PATENT DOCUMENTS 6,353,810 B1    3/2002   Petrushin
6,480,826 B2 *  11/2002  Pertrushin ............... G10L 17/26
                                                    704/270

(Continued)

FOREIGN PATENT DOCUMENTS

WO    WO 02/39371       5/2002
WO    WO 2013/027893    2/2013

(Continued)

OTHER PUBLICATIONS

U.S. Appl. No. 14/525,002, filed Oct. 27, 2014, Conway et al.

(Continued)

*Primary Examiner* — Jialong He
(74) *Attorney, Agent, or Firm* — Haynes and Boone LLP

(57) ABSTRACT

The methods and systems described herein predict user behavior based on analysis of a user video communication. The methods include receiving a user video communication, extracting video facial analysis data from the video communication, extracting voice analysis data from the video communication, associating the video facial analysis data with the voice analysis data to determine an emotional state of a user, collecting biographical profile information specific to the user, applying a linguistic-based psychological behavioral model to the spoken words to determine personality type of the user, and inputting the collected biographical profile information, emotional state, and personality type into a predictive model to determine a likelihood of an outcome of the video communication.

30 Claims, 4 Drawing Sheets

(56) References Cited

U.S. PATENT DOCUMENTS

| | | | |
|---|---|---|---|
| 6,585,521 | B1 | 7/2003 | Obrador |
| 6,600,821 | B1* | 7/2003 | Chan ..................... H04M 3/51 |
| | | | 379/265.07 |
| 6,964,023 | B2 | 11/2005 | Maes et al. |
| 7,003,139 | B2 | 2/2006 | Endrikhovski et al. |
| 7,451,079 | B2* | 11/2008 | Oudeyer .................. G10L 17/26 |
| | | | 704/205 |
| 7,689,010 | B2 | 3/2010 | Canzler et al. |
| 7,734,468 | B2 | 6/2010 | Park et al. |
| 7,999,857 | B2* | 8/2011 | Bunn ..................... G10L 15/25 |
| | | | 348/143 |
| 8,068,676 | B2 | 11/2011 | Zhang et al. |
| 8,098,273 | B2 | 1/2012 | Khouri et al. |
| 8,209,182 | B2 | 6/2012 | Narayanan |
| 8,463,595 | B1 | 6/2013 | Rehling |
| 8,594,285 | B2 | 11/2013 | Conway et al. |
| 8,600,100 | B2 | 12/2013 | Hill |
| 8,825,584 | B1 | 9/2014 | Miller |
| 2003/0055654 | A1 | 3/2003 | Oudeyer |
| 2003/0182123 | A1 | 9/2003 | Mitsuyoshi |
| 2004/0001616 | A1 | 1/2004 | Gutta |
| 2004/0117185 | A1* | 6/2004 | Scarano ............. H04M 3/2281 |
| | | | 704/254 |
| 2005/0187437 | A1* | 8/2005 | Matsugu .................. A61B 5/16 |
| | | | 600/301 |
| 2006/0028556 | A1 | 2/2006 | Bunn et al. |
| 2006/0260624 | A1* | 11/2006 | Schur ..................... A61B 5/16 |
| | | | 128/898 |
| 2006/0265089 | A1* | 11/2006 | Conway .................. G10L 15/22 |
| | | | 700/94 |
| 2008/0037837 | A1 | 2/2008 | Noguchi et al. |
| 2008/0169929 | A1* | 7/2008 | Albertson ........ G08B 13/19613 |
| | | | 340/573.1 |
| 2009/0079816 | A1* | 3/2009 | Qvarfordt .......... G06K 9/00335 |
| | | | 348/14.16 |
| 2009/0103711 | A1 | 4/2009 | Conway et al. |
| 2010/0185564 | A1 | 7/2010 | King et al. |
| 2011/0007142 | A1 | 1/2011 | Perez et al. |
| 2011/0295583 | A1* | 12/2011 | Hollock ............. G06K 9/00335 |
| | | | 703/11 |
| 2013/0039483 | A1* | 2/2013 | Wolfeld .................. H04M 3/00 |
| | | | 379/265.03 |
| 2014/0005564 | A1 | 1/2014 | Ivanovic et al. |
| 2014/0025385 | A1 | 1/2014 | Atri et al. |
| 2014/0112556 | A1 | 4/2014 | Kalinli-Akbacak |

FOREIGN PATENT DOCUMENTS

| | | |
|---|---|---|
| WO | WO 2013/156828 | 10/2013 |
| WO | WO 2014/061015 | 4/2014 |

OTHER PUBLICATIONS

Chen, Lawrence S. et al., "Multimodal Human Emotion/Expression Recognition," 1998, pp. 1-6.

Benoit, Christian et al., "Multimodal Speech systems," 1999, pp. 1-77.

Busso, Carlos et al., "Analysis of Emotion recognition using Fical Expressions, Speech and Multimodal Information," ICMI'04, Oct. 24, 2004, pp. 205-211.

Sebe, Nicu et al., "Bimodal Emotion recognition," 2005, 4 pages.

Zeng, Zhihong et al., "A Survey of Affect Recognition Methods: Audio, Visual, and Spontaneous Expressions," IEEE Transactions on Pattern Analysis and Machines Intelligence, vol. 31, No. 1, Jan. 2009, pp. 39-58.

Ruvolo, Paul et al., "An Alternative to Low-Level-Synchrony-Based Methods for Speech Detection," 2010, pp. 1-9.

Ghimire, D., "Geometric Feature-Based Facial Expression recognition in Image Sequences Using Multi-Class AdaBoost and Support Vector Machines," Sensors, 2013:13, pp. 7714-7734.

"Affdex Discovery™", www.web2pdfconvert.com, 2014, 1 page.

* cited by examiner

PREDICTIVE VIDEO ANALYTICS SYSTEM AND METHODS

CROSS-REFERENCE TO RELATED APPLICATION

This application is a continuation of U.S. patent application Ser. No. 14/525,002, filed Oct. 27, 2014, now allowed, the entire contents of which is hereby incorporated herein by express reference thereto.

TECHNICAL FIELD

The present disclosure generally relates to methods and systems for analyzing electronic multimedia communications including a video component, and more particularly to methods and systems that analyze video communications to predict user behavior.

BACKGROUND OF THE DISCLOSURE

Real-time video communication services, such as real-time video calling services, are increasingly being used for interpersonal communications. For example, companies may receive incoming video communications from their customers.

Users have also leveraged more traditional communication services to send and receive video content. For example, a user may attach a video file to an email message, text message, or digital message board post. In addition, video sharing services allow users of the services to share videos with other users of the services. For example, a user may upload a video to a video sharing service such as YouTube®. Once the video has been uploaded, other users of the video sharing service may access and view the video.

A typical company makes no use of the potentially rich, video information available in a communication including a video component. Examples of such information include the user presentation (e.g., the user attire and associated style, user mannerisms, physical condition, and mood), and background information of the user. Thus, based on the disclosure below, such information can prove useful in predicting the behavior of a user, such as a customer or a potential customer.

SUMMARY

The present disclosure encompasses a video analytics system adapted to predict user behavior based on analysis of a video communication, which includes a node including a processor and a non-transitory computer readable medium operably coupled thereto, the non-transitory computer readable medium including a plurality of instructions stored in association therewith that are accessible to, and executable by, the processor, where the plurality of instructions includes: instructions that, when executed, receive a video communication from a user, wherein the video communication includes an audio component and a video component; instructions that, when executed, analyze the video component to provide time-coded video behavioral data from the user; instructions that, when executed, analyze the audio component to provide time-coded spoken words from the user, instructions that, when executed, associate the time-coded spoken words with the video behavioral data to determine an emotional state of the user; instructions that, when executed, collect biographical profile information specific to the user; instructions that, when executed, determine a personality type of the user by applying a linguistic-based algorithm to the spoken words, searching a density of keywords in the spoken words, and comparing the keywords to a library separated by different personality types; and instructions that, when executed, enter the collected biographical profile information, the emotional state, and the personality type into a predictive model, wherein the predictive model generates an indication of a likelihood of an outcome of the video communication.

In another embodiment, the present disclosure encompasses a method to predict user behavior based on analysis of a video communication, which includes: receiving, by one or more processors, a user video communication; extracting, by the one or more processors, video facial analysis data for the user from the video communication; extracting, by the one or more processors, voice analysis data from the user video communication; associating, by the one or more processors, the video facial analysis data with the voice analysis data to determine an emotional state of the user, collecting, by the one or more processors, biographical profile information specific to the user; determining, by the one or more processors, a personality type of the user by applying a linguistic-based algorithm to the spoken words, searching a density of keywords in the spoken words, and comparing the keywords to a library separated by different personality types; and entering, by the one or more processors, the collected biographical profile information, the emotional state, and the personality type into a predictive model, wherein the predictive model generates an indication of a likelihood of an outcome of the video communication.

In yet a further embodiment, the disclosure encompasses a non-transitory machine-readable medium including instructions which, in response to a computer system, cause the computer system to perform a method which includes: receiving a user video communication; separating an audio component from a video component of the video communication; analyzing facial expressions of the user in the video component; transcribing words spoken of the user in the audio component; associating the facial expressions and spoken words to determine an emotional state of the user; collecting biographical profile information specific to the user; determining a personality type of the user by applying a linguistic-based algorithm to the spoken words, searching a density of keywords in the spoken words, and comparing the keywords to a library separated by different personality types; and entering the collected biographical profile information, the emotional state, and the personality type into a predictive model, wherein the predictive model generates an indication of a likelihood of an outcome of the video communication.

In a second aspect, the present disclosure describes methods and systems that analyze user video communications to predict user behavior. The present methods evaluate both verbal and non-verbal behavior of the user to determine an emotional state and personality type of the user. The emotional state and personality type can then be used in a predictive model to determine the likelihood of an outcome of the user video communication.

In one embodiment, the present disclosure relates to a system adapted to predict user behavior based on analysis of a video communication. The system includes a node that includes a processor and a non-transitory computer readable medium operably coupled thereto, and the non-transitory computer readable medium includes a plurality of instructions stored in association therewith that are accessible to, and executable by, the processor. The plurality of instructions include instructions, that when executed, receive a video communication from a user, wherein the video communication comprises an audio component and a video component; instructions, that when executed, analyze the video component to provide time-coded video behavioral data; instructions, that when executed, analyze the audio component to provide time-coded spoken words from the user; instructions, that when executed, associate the time-coded spoken words with the video behavioral data to determine an emotional state of the user; instructions, that when executed, determine a personality type of the user by applying a linguistic-based algorithm to the spoken words; and instructions, that when executed, enter the emotional state and personality type into a predictive model to predict a likelihood of an outcome of the video communication.

In a second embodiment, the present disclosure relates to a method to predict user behavior based on analysis of video communication. The method includes receiving, by one or more processors, a user video communication; extracting, by the one or more processors, video facial analysis data for the user from the video communication; extracting, by the one or more processors, voice analysis data from for the user video communication; associating, by the one or more processors, the video facial analysis data with the voice analysis data to determine an emotional state of the user; applying, by the one or more processors, a linguistic-based psychological behavioral model to the voice analysis data to determine personality type of the user; and inputting, by the one or more processors, the emotional state and personality type into a predictive model to determine a likelihood of an outcome of the video communication.

In a third embodiment, the present disclosure relates to a non-transitory computer readable medium that includes a plurality of instructions, which in response to a computer system, cause the computer system to perform a method. The method includes receiving a user video communication; separating an audio component from a video component of the video communication; analyzing facial expressions of the user in the video component; transcribing words spoken by the user in the audio component; associating the facial expressions and spoken words to determine an emotional state of the user; determining a personality type of the user using a linguistic-based algorithm; and using the emotional state and personality type to predict a likelihood of an outcome of the video communication.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE PREFERRED EMBODIMENTS

Figure 1:
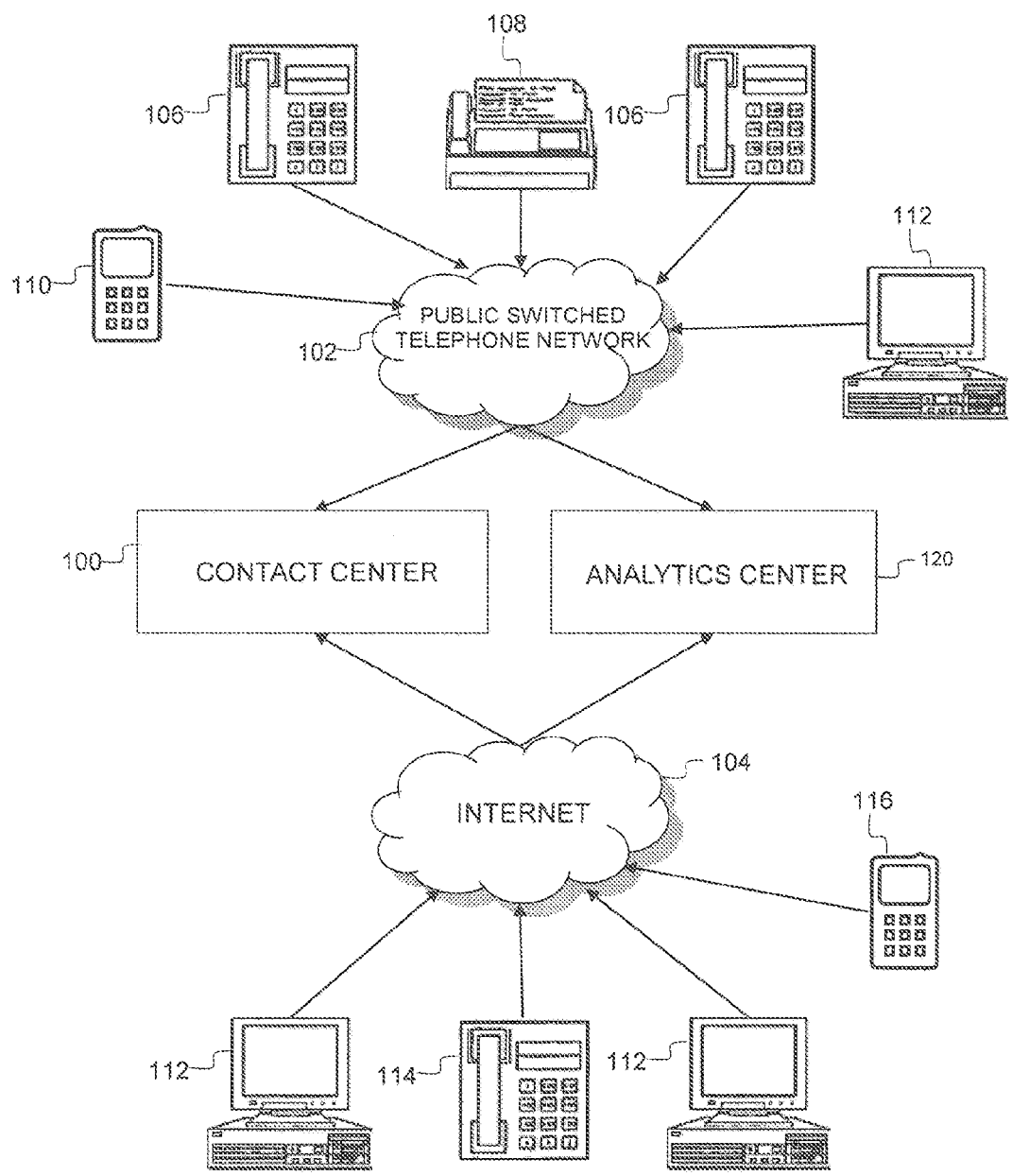
FIG. 1 is a simplified block diagram of an embodiment of a contact center according to various aspects of the present disclosure.

The present disclosure advantageously provides for methods of predicting user behavior based on analysis of a video communication. These methods typically include receiving a user video communication, analyzing the video communication to extract time-coded video behavioral data and time-coded words, associating the time-coded video behavioral data with the time-coded words to determine an emotional state of the user, determining a personality type of a user using the words, and entering the emotional state and personality type into a predictive model to predict a user behavior or outcome of the communication. "User" as used herein is meant a person talking in a video communication, such as a customer or a potential customer of a company or contact center. "Video communication" as used herein is meant to encompass two-party video communications (e.g., video communications between an agent and a customer) and single party video communications (e.g., video communication with just one user speaking).

Systems and apparatuses for carrying out these methods are also part of the present disclosure. An exemplary system to predict user behavior includes, for example, a node including a processor and a computer readable medium operably coupled thereto, the computer readable medium comprising a plurality of instructions stored in association therewith that are accessible to, and executable by, the processor, where the plurality of instructions includes instructions, that when executed, receive a user video communication, wherein the video communication comprises an audio component and a video component, analyze the video component to provide time-coded video behavioral data, analyze the audio component to provide time-coded words spoken by a user, associate the time-coded spoken words with the video behavioral data to determine an emotional state of the user, determine a personality type of the user by applying a linguistic-based algorithm to the spoken words, and enter the emotional state and personality type into a predictive model to predict an outcome of the video communication.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a simplified block diagram of an embodiment of a contact center 100 according to various aspects of the present disclosure. A "contact center" as used herein can include any facility or system server suitable for receiving and recording electronic communications from users. Such user communications can include, for example, telephone calls, facsimile transmissions, e-mails, web interactions, voice over IP ("VoIP") and video interactions. Various specific types of communications contemplated through one or more of these channels include, without limitation, email. SMS data (e.g., text), tweet, instant message, web-form submission, smartphone app, social media data, and web content data (including but not limited to internet survey data, blog data, microblog data, discussion forum data, and chat data), etc. In some embodiments, the communications can include user tasks, such as taking an order, making a sale, responding to a complaint, etc. In various aspects, real-time video communication, and preferably also voice communication, are included in the communications. It is contemplated that these communications may be transmitted by and through any type of telecommunication device and over any medium suitable for carrying such data. For example, the communications may be transmitted by or through telephone lines, cable, or wireless communications (e.g., satellite, Wi-Fi, bluetooth, cellular phone network, etc.). As shown in FIG. 1, the contact center 100 of the present disclosure is adapted to receive and record varying electronic communications and data formats that represent an interaction that may occur between a user (or caller) and a contact center agent during fulfillment of a user and agent transaction. In one embodiment, the contact center 100 records all of the user contacts in uncompressed audio and video formats. In the illustrated embodiment, users may communicate with agents associated with the contact center 100 via multiple different communication networks, such as a public switched telephone network (PSTN) 102 or the Internet 104, e.g., including via Skype®, Facetime®, Tango™, or any other video-enabled communication app, program, website, or other software or hardware. For example, a user may initiate an interaction session through traditional telephones 106, a fax machine 108, a cellular (i.e., mobile) telephone 110 (e.g., such as a smartphone with video capabilities), a personal computing device 112 with a modem, or other legacy communication device via the PSTN 102, followed by communication involving a video component, or may simply use a video-enabled communication technique in the first instance. Further, the contact center 100 may accept internet-based interaction sessions from personal computing devices 112, VoIP telephones 114, and internet-enabled smartphones 116 and personal digital assistants (PDAs), provided there is a video component involved in the substantive communication.

As one of ordinary skill in the art would recognize, the illustrated example of communication channels associated with a contact center 100 in FIG. 1 is just an example, and the contact center may accept user interactions, and other analyzed interaction information from an analytics center, through various additional and/or different devices and communication channels whether or not expressly described herein.

For example, in some embodiments, internet-based interactions, video-based interactions, and/or telephone-based interactions may be routed through an analytics center 120 before reaching the contact center 100 or may be routed simultaneously to the contact center and the analytics center (or even directly and only to the contact center). In some instances, the analytics center 120 is a third-party analytics company that captures multimedia interaction data associated with the contact center 100 and applies predictive analytics to the data to generate actionable intelligence for the contact center. For example, the analytics center 120 may provide a prediction of user behavior according to the present disclosure, receive a video communication, analyze the audio and video components of the video communication, determine personality type of a user, etc. The analytics center 120 may be controlled by the same entity or a different entity than the contact center 100. Further, the analytics center 120 may be a part of, or independent of, the contact center 100.

Figure 2:
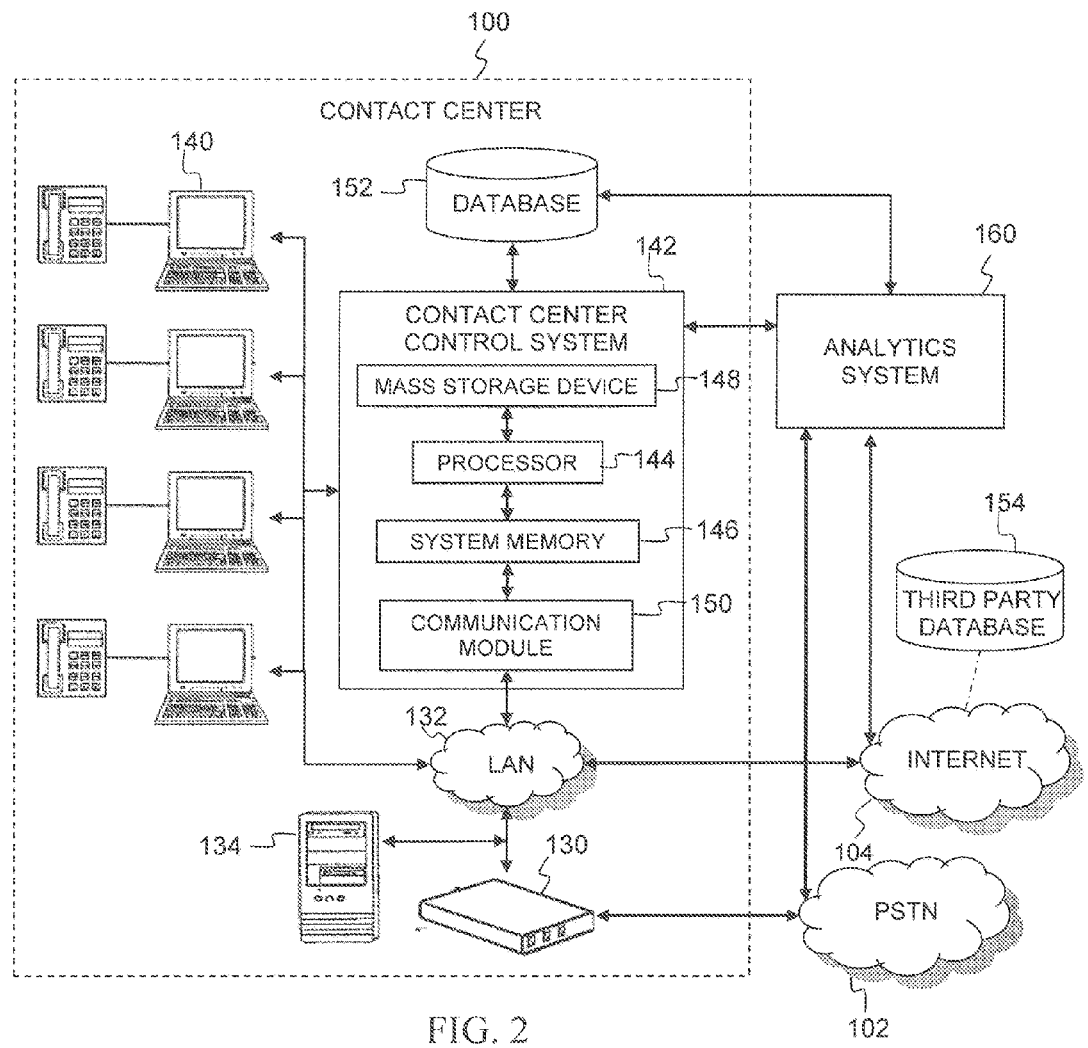
FIG. 2 is a more detailed block diagram of the contact center of FIG. 1 according to aspects of the present disclosure.

FIG. 2 is a more detailed block diagram of an embodiment of the contact center 100 according to aspects of the present disclosure. As shown in FIG. 2, the contact center 100 is communicatively coupled to the PSTN 102 via a distributed private branch exchange (PBX) switch 130. The PBX switch 130 provides an interface between the PSTN 102 and a local area network (LAN) 132 within the contact center 100. In general, the PBX switch 130 connects trunk and line station interfaces of the PSTN 102 to components communicatively coupled to the LAN 132. The PBX switch 130 may be implemented with hardware or virtually. A hardware-based PBX may be implemented in equipment located local to the user of the PBX system. In contrast, a virtual PBX may be implemented in equipment located at a central telephone service provider that delivers PBX functionality as a service over the PSTN 102. Additionally, in one embodiment, the PBX switch 130 may be controlled by software stored on a telephony server 134 coupled to the PBX switch. In another embodiment, the PBX switch 130 may be integrated within telephony server 134. The telephony server 134 incorporates PBX control software to control the initiation and termination of connections between telephones within the contact center 100 and outside trunk connections to the PSTN 102. In addition, the software may monitor the status of all telephone stations coupled to the LAN 132 and may be capable of responding to telephony events to provide traditional telephone service. In certain embodiments, this may include the control and generation of the conventional signaling tones including without limitation dial tones, busy tones, ring back tones, as well as the connection and termination of media streams between telephones on the LAN 132. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

In one embodiment, the telephony server 134 includes a trunk interface that utilizes conventional telephony trunk transmission supervision and signaling protocols required to interface with the outside trunk circuits from the PSTN 102. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multi-channel data images, video, text or audio.

The telephony server 134 includes hardware and software components to interface with the LAN 132 of the contact center 100. In one embodiment, the LAN 132 may utilize IP telephony, which integrates audio and video stream control with legacy telephony functions and may be supported through the H.323 protocol. H.323 is an International Telecommunication Union (ITU) telecommunications protocol that defines a standard for providing voice and video services over data networks. H.323 permits users to make point-to-point audio and video phone calls over a local area network. IP telephony systems can be integrated with the public telephone system through an IP/PBX-PSTN gateway, thereby allowing a user to place telephone calls from an enabled computer. For example, a call from an IP telephony client within the contact center 100 to a conventional telephone outside of the contact center would be routed via the LAN 132 to the IP/PBX-PSTN gateway. The IP/PBX-PSTN gateway would then translate the H.323 protocol to conventional telephone protocol and route the call over the PSTN 102 to its destination. Conversely, an incoming call from a user over the PSTN 102 may be routed to the IP/PBX-PSTN gateway, which translates the conventional telephone protocol to H.323 protocol so that it may be routed to a VoIP-enabled phone or computer within the contact center 100.

The contact center 100 is further communicatively coupled to the Internet 104 via hardware and software components within the LAN 132. One of ordinary skill in the art would recognize that the LAN 132 and the connections between the contact center 100 and external networks such as the PSTN 102 and the Internet 104 as illustrated by FIG. 2 have been simplified for the sake of clarity and the contact center may include various additional and/or different software and hardware networking components such as routers, switches, gateways, network bridges, hubs, and legacy telephony equipment. It should be understood that in all embodiments of the present disclosure, a video communication or video component is required as part of the substantive communication to or between the user and the contact center and/or analytics center.

As shown in FIG. 2, the contact center 100 includes a plurality of agent workstations 140 that enable agents employed by the contact center 100 to engage in user interactions over a plurality of communication channels. In one embodiment, each agent workstation 140 may include at least a telephone and a computer workstation. In other embodiments, each agent workstation 140 may include a computer workstation that provides both computing and telephony functionality. Through the workstations 140, the agents may engage in telephone conversations with the user, respond to email inquiries, receive faxes, engage in instant message conversations, respond to website-based inquires, video chat with a user, and otherwise participate in various user interaction sessions across one or more channels provided that video communication or a video component is included in at least one substantive interaction by the user. Further, in some embodiments, the agent workstations 140 may be remotely located from the contact center 100, for example, in another city, state, or country. Alternatively, in some embodiments, an agent may be a software-based application configured to interact in some manner with a user. An exemplary software-based application as an agent is an online chat program designed to interpret user inquiries and respond with pre-programmed answers.

The contact center 100 further includes a contact center control system 142 that is generally configured to provide recording, voice analysis, video analysis, behavioral analysis, storage, and other processing functionality to the contact center. In the illustrated embodiment, the contact center control system 142 is an information handling system such as a computer, server, workstation, mainframe computer, or other suitable computing device. In other embodiments, the control system 142 may be a plurality of communicatively coupled computing devices coordinated to provide the above functionality for the contact center 100. The control system 142 includes a processor 144 that is communicatively coupled to a system memory 146, a mass storage device 148, and a communication module 150. The processor 144 can be any custom made or commercially available processor, a central processing unit (CPU), an auxiliary processor among several processors associated with the control system 142, a semiconductor-based microprocessor (in the form of a microchip or chip set), a macroprocessor, a collection of communicatively coupled processors, or any device for executing software instructions. The system memory 146 provides the processor 144 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data may be stored on the mass storage device 148. Examples of mass storage devices may include hard discs, optical disks, magneto-optical discs, solid-state storage devices, tape drives, CD-ROM drives, and/or a variety of other mass storage devices known in the art. Further, the mass storage device may be implemented across one or more network-based storage systems, such as a storage area network (SAN). The communication module 150 is operable to receive and transmit contact center-related data between local and remote networked systems and communicate information such as user interaction recordings between the other components coupled to the LAN 132. Examples of communication modules may include Ethernet cards, 802.11 WiFi devices, cellular data radios, and/or other suitable devices known in the art. The contact center control system 142 may further include any number of additional components, which are omitted for simplicity, such as input and/or output (I/O) devices (or peripherals), buses, dedicated graphics controllers, storage controllers, buffers (caches), and drivers. Further, functionality described in association with the control system 142 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 142 is configured to record, collect, and analyze user voice and video data and other structured and unstructured data, and other tools may be used in association therewith to increase efficiency and efficacy of the contact center. As an aspect of this, the control system 142 is operable to record unstructured interactions between users and agents occurring over different communication channels including without limitation telephone conversations, video communications, email exchanges, website postings, social media communications, smartphone application (i.e., app) communications, fax messages, instant message conversations, etc. For example, the control system 142 may include a hardware or software-based recording server to capture the audio of a standard or VoIP telephone connection established between an agent workstation 140 and an outside user telephone system. Further, the audio from an unstructured telephone call or video conference session may be transcribed manually or automatically and stored in association with the original audio or video. In one embodiment, multiple communication channels (i.e., multi-channel) may be used according to the invention, either in real-time to collect information, for evaluation, or both. For example, control system 142 can receive, evaluate, and store telephone calls, video communications, emails, and fax messages. Thus, multi-channel can refer to multiple channels of interaction data, or analysis using two or more channels at least one of which typically includes video, depending on the context herein.

In addition to unstructured interaction data such as interaction transcriptions, the control system 142 is configured to captured structured data related to users, agents, and their interactions. For example, in one embodiment, a "cradle-to-grave" recording may be used to record all information related to a particular call or contact from the time the contact enters the contact center to the later of: the user terminating contact or the agent completing the transaction. All or a portion of the interactions during the call or other contact may be recorded, including interaction with an interactive voice response (IVR) system, time spent on hold, data keyed through the caller's key pad, conversations with the agent, and screens displayed by the agent at his/her station during the transaction. Additionally, structured data associated with interactions with specific users may be collected and associated with each user, including without limitation the number and length of contacts placed to the contact center, contact origination information, reasons for interactions, outcome of interactions, average hold time, agent actions during interactions with user, manager escalations during user contact, types of social media interactions, number of distress events during interactions, survey results, and other interaction information. In addition to collecting interaction data associated with a user, the control system 142 is also operable to collect biographical profile information specific to a user including without limitation user phone number or email address, account/policy numbers, address, employment status, income, gender, race, age, education, nationality, ethnicity, marital status, credit score, user "value" data (i.e., user tenure, money spent as user, etc.), personality type (e.g., as determined by past interactions), and other relevant user identification and biological information. The control system 142 may also collect agent-specific unstructured and structured data including without limitation agent personality type, gender, language skills, performance data (e.g., retention rate, etc.), tenure and salary data, training level, average hold time during interactions, manager escalations, agent workstation utilization, and any other agent data relevant to contact center performance. Additionally, one of ordinary skill in the art would recognize that the types of data collected by the contact center control system 142 that are identified above are simply examples and additional and/or different interaction data, user data, agent data, video data, and telephony data may be collected and processed by the control system 142.

The control system 142 may store recorded and collected interaction data in a database 152, including user data and agent data. In certain embodiments, agent data, such as agent scores for dealing with users, are updated daily.

The control system 142 may store recorded and collected interaction data in a database 152. The database 152 may be any type of reliable storage solution such as a RAID-based storage server, an array of hard disks, a storage area network of interconnected storage devices, an array of tape drives, or some other scalable storage solution located either within the contact center or remotely located (i.e., in the cloud). Further, in other embodiments, the contact center control system 142 may have access not only to data collected within the contact center 100 but also data made available by external sources such as a third party database 154. In certain embodiments, the control system 142 may query the third party database for user data such as credit reports, past transaction data, and other structured and unstructured data.

The control system 142, in certain embodiments, includes a video analysis module that evaluates video associated with the user communication. The video analysis module can identify one or more of the following: actions (or bodily movement) of the user, a bodily position of the user, a bodily orientation of the user, the attire of the user including an item or article of clothing or jewelry or other accessory worn or used by the user, a gesture of the user, a mood of the user, a mannerism of the user, and a facial expression of the user. It should be understood that body posture encompasses both bodily position and bodily orientation, and that eye movement (e.g., including rate of blinking, eye tracking, focus, etc.), activities, behaviors and actions can affect mannerism, actions, and mood of the user. In various embodiments, identification of the various attributes and behavior of the user results in the prediction of one or more of the following: a socioeconomic class of the user, a class of the user, an age of the user, a profession of the user, and a manufacture, brand, or model of an item associated with the user.

The video analysis module may include and apply a number of video analytics or video content analysis algorithms. These algorithms typically utilize a combination of computer vision, pattern analysis, and machine intelligence to detect, recognize, or otherwise sense visual objects. Video analytics uses computer vision algorithms to enable it to perceive or see and machine intelligence to interpret, learn and draw inferences. Video analytics can understand a scene, and can qualify an object, understand the context around the object, and track the object through the scene. Commonly, video analytics detects changes occurring over successive frames of video, qualifies these changes in each frame, correlates qualified changes over multiple frames, and interprets these correlated changes.

Objects recognizable by video analytics can take many forms. Examples include bodily or body part movements, positions and relative orientations (e.g., gaze direction, bodily movements and gestures such as expressions or moods/emotions denoting anger, shock, surprise, panic or fear, and the like, mannerisms, styles, bodily poses, and the like), facial expressions, attire including articles or items of clothing and accessories such as jewelry and mobile devices, non-human objects in the foreground or background (such as cars, animals, lights and light colors (such as of an emergency vehicle), trees, snow, and the like), human objects in the foreground or background, and the like. Certain types of attire can be determined using any technique, method, or software available to those of ordinary skill in the art. For example, such software is commercially available from Graymatics.

The output of the video analytics algorithms is typically an activity report containing sensed information and optionally also information analyzed or calculated from such sensed information, which may be used for various purposes, including, but not limited to, selecting an appropriate skilled agent to service the contact and/or providing information to the selected agent to better serve the user.

In some embodiments, an analytics system 160 may also perform some or all of the functionality ascribed to the contact center control system 142 above. For instance, the analytics system 160 may record telephone, video, and internet-based interactions all including a video component, as well as perform behavioral analyses, predict user personalities or user profiles, retrieve pre-existing user profiles, and perform other contact center-related computing tasks, as well as combinations thereof. The analytics system 160 may be integrated into the contact center control system 142 as a hardware or software module and share its computing resources 144, 146, 148, and 150, or it may be a separate computing system housed, for example, in the analytics center 120 shown in FIG. 1. In the latter case, the analytics system 160 includes its own processor and non-transitory computer-readable storage medium (e.g., system memory, hard drive, etc.) on which to store predictive analytics software and other software instructions.

The multi-channel and multimedia interaction data collected in the context of the control center 100 may be subject to a linguistic-based psychological behavioral model to assess the personality of users and agents associated with the interactions. For example, such a behavioral model may be applied to the transcription of a video-enabled telephone call or instant video chat between a user and agent to gain insight into why a specific outcome resulted from the interaction.

In one embodiment, a voice analysis module in control system 142 mines interaction data for behavioral signifiers associated with a linguistic-based psychological behavioral model. In particular, the voice analysis module searches for and identifies text-based keywords (i.e., behavioral signifiers) relevant to a predetermined psychological behavioral model. In a preferred embodiment, multi-channels are mined for such behavioral signifiers.

It is well known that certain psychological behavioral models have been developed as tools, and any such behavioral model available to those of ordinary skill in the art will be suitable for use in connection with the disclosure. These models are used to attempt to evaluate and understand how and/or why one person or a group of people interacts with another person or group of people. One example is the Big Five inventory model (©2000) by UC Berkeley psychologist Oliver D. John, Ph.D. Another is the Process Communication Model™ developed by Dr. Taibi Kahler. Exemplary personality types, which will vary from model to model and can be selected as desired for a given application or across all applications, might include, for example: Thoughts, Opinions, Reactions, Emotions. These models generally presuppose that all people fall primarily into one of the enumerated basic personality types. In some cases, the models categorize each person as one of these four types (or some other number of personality types), all people have parts of each of the types within them. Each of the types may learn differently, may be motivated differently, may communicate differently, and may have a different sequence of negative behaviors in which they engage under certain circumstances, e.g., when they are in distress. Importantly, each personality type may respond positively or negatively to communications that include tones or messages commonly associated with another of the personality types. Thus, an understanding of a user's personality type typically offers guidance as to how the user will react or respond to different situations.

In addition to the behavioral assessment of interaction data, the control system 142 may also or alternatively apply distress analysis techniques to interaction data to detect distress events. For example, when applied to a telephone or video-based interaction session, linguistic-based distress analysis may be conducted on both a textual translation of voice data and an audio file containing voice data. Accordingly, linguistic-based analytic tools as well as non-linguistic analytic tools may be applied to the audio file. In particular, the control system 142 may apply spectral analysis to the audio file voice data while applying a human speech/linguistic analytical tool to the text file. Linguistic-based analysis and algorithms for identifying distress can be applied to the textual translation of the communication. Resultant distress data may be stored in the database 152 or elsewhere for subsequent analysis of the communication. Distress event data and other linguistic-based analytic data may be considered behavioral assessment data in some instances. Further, in other embodiments, the control system 142 may be operable to apply voice printing techniques to the unstructured audio from various user interactions. For example, a recorded sample may be utilized to identify, or facilitate identification of, a user in the event the user did not supply any identifying information.

Often, in contact center environments such as contact center 100, it is desirable to predict the likelihood of some specific outcome occurring in association with a user interaction that includes a video component, be it a telephone-based interaction, a web-based interaction, video-based interaction, or other type of electronic interaction over the PSTN 102 or Internet 104. For example, it may be useful for a company to predict during or after a user interaction the probability of whether the user will cancel his or her service after the completion of the call. If attrition is predicted, the agent on the call may be proactive in mitigating user dissatisfaction, either in all circumstances or for users meeting one or more pre-defined criteria. Traditionally, limited categories of user data are used to create predictive models. As a result, such models tend not to be as accurate as possible because of limited data inputs and because of the heterogeneous nature of interaction data collected across multiple different communication channels.

As further described herein, user data, agent data, and/or behavioral assessment of interaction data (e.g., personality type, linguistic analysis data, distress analysis data, video analysis data, etc.) may be employed to create more accurate predictive models for use in the contact center 100. Such models may in various embodiments be generated with any number of these data types, including any combination of these data types together. In one embodiment, the contact center control system 142 includes predictive analytics software operable to create binary logistic regression models based on collected structured and unstructured contact center data.

Figure 3:
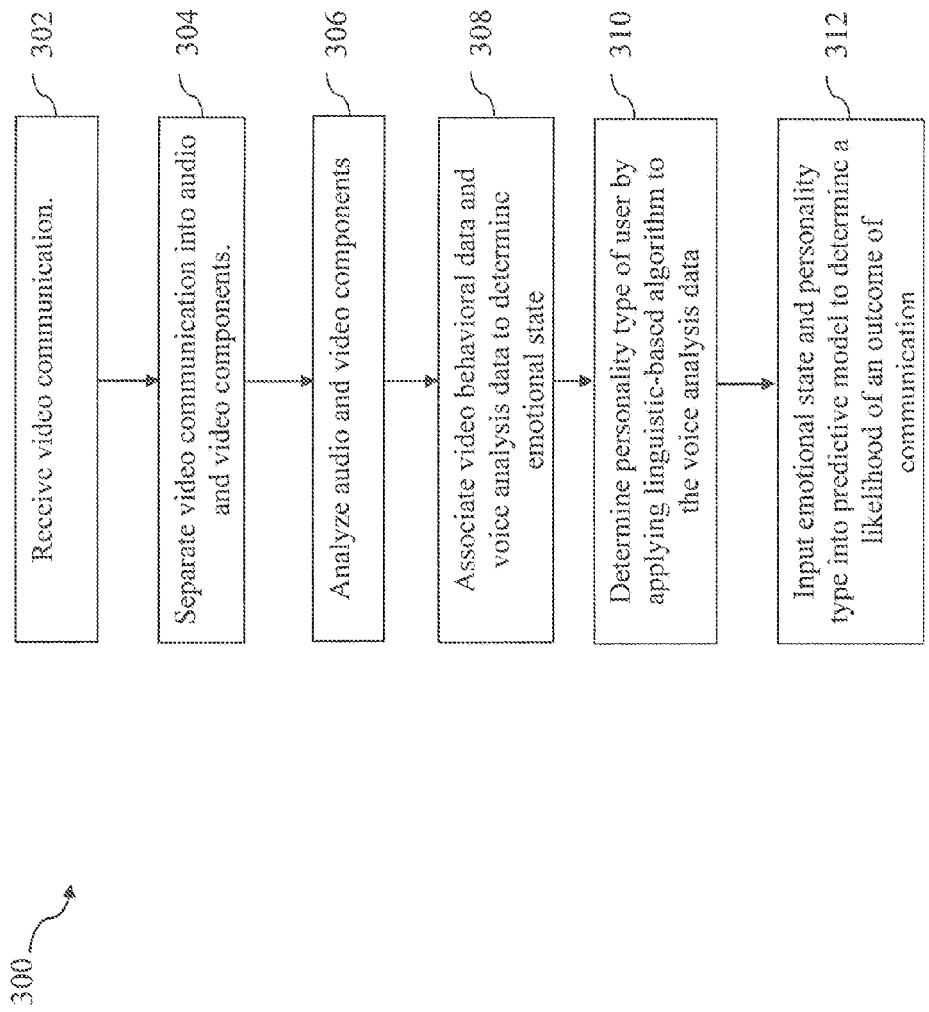
FIG. 3 is a flowchart illustrating a preferred method of predicting user behavior based on analysis of a video communication according to aspects of the present disclosure.

As one of ordinary skill in the art would recognize, while the present disclosure describes systems and methods primarily in the context of a contact center, the described systems and methods are not limited to use in contact centers. For example, the present disclosure does not require concurrent participation of users communicating with one another. Users can exchange video messages without time interdependencies and without having to concurrently participate in a real-time video communication session. For instance, a user may record a video communication of the user talking and post the video communication to a message board and/or social networking site. The video communication can then be analyzed by, for example, analytics center 120 to predict user behavior according to the present disclosure, receive a video communication, analyze the audio and video components of the video communication, and determine personality type of a user, as described above. An exemplary method 300 of predicting user behavior based on analysis of video communications will now be described with respect to FIG. 3. At step 302, a video communication or task is received from a user, for example, at contact center 100. The contact center 100 in one embodiment may be replaced by, or be associated with, an analytics center 120. The video communication may be live or recorded, and generally includes both video and audio components. In exemplary embodiments, the video communication includes a time log that associates the video component with the audio component so they are synchronous.

The video communication generally includes information such as user attire, associated style, user mannerism(s), mood(s) or expression(s), or other similar characteristics described herein, as may be denoted by body expression, position, movements, and the like. From this information, the video analytics module can ascertain a category, a socioeconomic class (e.g., from estimated cost of user attire), actual or prospective user class or category (e.g., gold, silver or bronze), community, or geographical region to which the user belongs and/or in which the user resides. The user, for instance, may be dressed with attire that is typically associated with a younger age group, a professional community, and/or an ethnic group. Other factors, such as the attire branding, presence of accessories like jewelry and even personal items, such as a tattoo, number of tattoos, friendship bracelet, affinity bracelet (e.g., breast cancer awareness) or a particular brand and model of smart phone, can be relevant in terms of preferences and the user's actual or self-perceived socioeconomic status. Video analysis of the other objects in the video communication can further be used to identify a prospective user need or purpose of the contact and therefore to identify a recommended resource or set of resources to service the user.

At step 304, the video communication is separated into its audio and video components, unless separate recording channels were already separately obtained and used to store this information (e.g., an internet-capable camera for video and a phone or cellular phone or VoIP for audio). The audio component includes sounds made and words/content spoken during the communication. The video component includes non-verbal, non-textual video elements, including, but not limited to, eye movement, facial expressions, gestures, activities, postures, behaviors, and actions as further described herein and as known to those of ordinary skill in the art.

At step 306, the audio component and video component are analyzed. For example, the video analysis module can employ methods of analyzing facial expressions to correlate facial expressions with specific times in the communication. The video analysis module can further output time-coded video behavioral data that reflects the emotion(s) associated with the facial expression at any particular time during the communication for each face visible in the communication. The voice analysis module can analyze the words by transcribing the audio component and associating the transcribed words with specific times in the communication.

In cases where there is more than one speaker or user in the communication, the audio and video components may be analyzed together at the same time or separately. For example, the voice analysis module can look for areas in the audio component where there is a lot of talking within a similar pitch range (e.g., long talking track with potential to be mainly one speaker). The video analysis module can then look for which person in the communication appears to be predominantly speaking to determine which user is speaking at a specific time. This can be achieved in whole or in part, for example, with commercially available tools such as The Cisco Media Experience Console.

In several embodiments, this process can be audited to review all of the selected audio segments for a single speaker to ensure that they are all within a similar audio range (pitch, tempo, etc.). If any segments are below a certain confidence level, the control system 142 can omit the segment or mark the segment as unknown, which can help minimize mismatching of user audio and video used for further analysis.

In various embodiments, non-verbal and non-action information like attire is also analyzed, such as clothing, jewelry, and accessories. In a contact center that is focused on sales opportunities, expensive branded clothing, jewelry, and accessories can be used as an indicator of a potential sale or upsell opportunity, analogous to a situation in a physical store where a sales attendant can make a judgment on the potential value of a user based on his or her presentation. Because the agent may be visible to the user, it can be relevant to have a strategy in place within the contact center as to how agents are presented (e.g., formal, casual dress, and the like). This is particularly true in the case of online/electronic avatars that represent a customer service agent, as they may be depicted or modified over time to better match the appearance of the user (or better match the appearance a user might desire). For example, a user in a suit may not respect or be as tolerant of an agent in slacks and a t-shirt, while a user in cut-off jeans and a ratty shirt may in some circumstances be put off by an agent in fancy or expensive clothing. In certain embodiments, the user's attire is used by the agent to recommend or suggest items (e.g., similarly priced or branded clothing, jewelry, or accessories) to the user. In an embodiment, recommended items (along with their prices) may be displayed to the agent. In exemplary embodiments, the non-verbal, non-action data is aggregated with the video behavioral data and the voice analysis data.

At step 308, the video behavioral data and voice analysis data are associated to determine an emotional state of the user. In exemplary embodiments, the words spoken by a user are associated with the corresponding synchronized video behavioral data. Speaker facial expressions are associated with speaker words/content for emotion analysis. The verbal and non-verbal behavior of the user are combined to better assess and extract the emotional state(s) of the user.

At step 310, a linguistic-based psychological behavioral model or algorithm is applied to the voice analysis data to determine personality type of the user. The voice analysis data, and specifically the speaker's words, may be analyzed and run through a linguistic algorithm to determine personality type of the user. The algorithm, for example, looks for specific terms, keywords and phrases (i.e., groups of keywords) that indicate a specific personality type and the density of those terms in the audio data. For example, reactions-type personalities use emotional words, opinions-types use opinion words, emotions-types use reflection words, and reactions-types use reaction words.

In various embodiments, these terms, phrases, or keywords are stored in a library or libraries that are accessed by the control system 142. The library may separate the keywords, terms, and phrases into different personality types. Keywords are the words previously determined to indicate the specific characteristic in the audio component. Each keyword may have respective aliases, which are essentially synonyms of keywords. Synonyms of the keywords may be identified and also stored in the library. The aliases are typically treated as interchangeable with the keywords from a scoring perspective, but in one embodiment aliases can be treated as not interchangeable if specific words, terms, or phrases are expected to be used. Also, due to the flexibility of the methods described herein, additional words, terms, and/or phrases may be added to the library at any time, such as based on additional input, external analysis of terminology, or both. For example, when it becomes apparent that another word is used frequently and is just as effective as the associated keyword, the library may be updated to include this word as an acceptable alias. In other embodiments, contextual weighting based on keywords used in context with certain related words may be used, to help determine personality type when a keyword is used by multiple personality types.

A linguistic algorithm(s) is typically created by linguistic analysts and such algorithm(s) are typically trained using previously analyzed user-agent communications. In one embodiment, the analyst(s) can review communications and manually label keywords or terms that are relevant to an identified category or predictor. The algorithm is trained to check for those keywords and the number of times they are used in the communications. A more sophisticated algorithm may be used that additionally checks for use of the keywords in context. One master algorithm containing many specific algorithms may also be used.

In some embodiments, time-coded distress and engagement are also determined for each speaker. The term "engagement" is meant herein to refer to the level of interest or commitment the user expresses in the audio component of the communication. A user who is engaged in the subject matter of the communication often shows excitement or enthusiasm in their speech and words. The term "distress" is meant herein to refer to dissatisfaction, anxiety, sorrow, anger, or a combination thereof. A user who is distressed about the communication will use words expressing sadness, anger, or disappointment. In exemplary embodiments, distress and engagement data are aggregated with the speaker content and facial expression data.

It may be desirable to predict the likelihood of some specific outcome occurring in association with a current user communication including a video component, whether it be a telephone-based interaction, web-based interaction, video-based interaction, or other type of electronic-assisted interaction. For example, it may be useful for a company to predict during a user communication whether the user will be satisfied as a result of the most recent interaction, taking into account the activities, outcomes, and experiences from prior interactions. Further examples of outcomes associated with a user include whether a user will purchase or sign up for a product or service, whether a user will terminate his or her account, whether the user will purchase a product, whether a user will pay an outstanding bill, whether a user is a fraudster, and whether a user will initiate additional subsequent interaction sessions regarding the same issue, or a combination thereof.

Additionally, the method 300 may be used to predict more specific outcomes associated with particular fields in which contact centers may be used. For example, the outcome may be the likelihood a user will apply for enrollment in a particular education institution or need financial aid in general or at that particular institution; the likelihood a user will recommend one of a specific service, company, or product to another user; or the likelihood a user will cure collections debt. Other outcomes may be whether a job applicant is suitable for a specific job opening, whether an applicant will accept a job offer, whether an applicant meets one or more pre-defined hiring criteria, and whether a person applying for enrollment at an educational institution meets one or more pre-defined acceptance criteria. This is a non-exhaustive list and additional and/or different outcomes related to a user or user interaction may be identified.

At step 312, the emotional state of the user and personality type are input into a predictive model or algorithm to determine the likelihood of an outcome of the user video communication. A predictive model operable to predict the likelihood of the identified outcome occurring may be built using previously collected input data (i.e., video data, audio data, personality types, and outcomes). In one embodiment, the video data and audio data are aggregated by personality type. Facial expressions, words, and outcomes for one type of personality can be grouped together in a database to predict user behavior and outcomes for that specific personality. This data can then be used to build predictive models for each of the different personality types.

As an example, a predictive model may indicate whether a user will cancel his or her service and be correlated to the user's personality, the number of distress events during a call, the agent's experience, the user's tenure, and the user emotions expressed during the call. A coefficient may then be assigned to each of the five variables. Data points associated with each of these five factors may be collected during a current user interaction, aggregated at the user level as needed, and multiplied by their respective coefficients to generate a prediction score indicative of the likelihood that a user will cancel his or her service. One of ordinary skill in the art would recognize that the above example is simply an illustration presented for the purposes of clarity, and the identified outcome may differ, as may the number of variables identified as relevant to that outcome, which may be smaller or much greater.

The outcome, in various embodiments, is displayed to the agent interacting with the user, a service agent supervisor, or management personnel. Depending on the severity of the outcome, the agent may be subjected to further training and/or discipline. In some embodiments, the contact center control system 142 can determine whether the agent uses the displayed outcome to modify his or her behavior with that user, or with future user, or both. For example, if the user is upset or angry, the agent may change the tone of his or her voice, the words used to communicate with the user, the approach in discussion with the user, the flexibility with decisions such as discounts or pricing with the user, or a combination of any of the foregoing.

Once an outcome is predicted, some action may be taken based on the outcome prediction. In various embodiments, the contact center control system 142 generates actionable tasks and provides them to the contact center 100. In one embodiment, some action may be taken during the current user communication to influence the predicted outcome, but in alternative embodiments, action may be taken after the termination of the current communication, or no action may be taken at all depending on the prediction result. Further, in certain embodiments, the agent interacting with the user may receive the predictive score at the agent workstation 140 and optionally take some action if warranted by the score, such as an action to mitigate user attrition. In other embodiments, after calculating the prediction score, the contact center control system 142 and/or the analytics system 160 may automatically take some action based on the calculated score, such as sending an email to the user or sending a signal to the agent prompting him or her to say or do something specific. As an example, if the predictive results indicate that there is a high likelihood that a user will terminate his or her service during or after the current communication, some remedial action may be taken during or after the current communication to prevent the user from terminating. Alternatively, if the probability of termination is sufficiently high, the action taken may be for the call center agent to conclude the communication as quickly as possible. As another example, if the predictive results indicate that there is a low likelihood that the user will be satisfied as a result of the communication, the agent may make a special offer to the user during the pendency of the communication, or the contact center control system 142 may automatically send an email with the special offer to the user based on the calculated score. In some embodiments, the contact center control system 142 transfers the user to another agent better equipped to handle the user, such as having a more complementary personality type to the user, to reduce the chances or even prevent a predicted outcome from occurring, or to increase the chances of causing a predicted outcome to occur. Still further, the action taken may be unrelated to influencing the likelihood of the identified outcome occurring. For example, the predicted outcome may be utilized to generate an agent performance score or generate training materials for agent training purposes.

In still other embodiments, the likelihood of one or more predicted outcomes can be used to evaluate if a contact center is improving in its customer service. For example, the number of times an identified outcome (good or bad) is predicted having a likelihood of greater than 50% for a certain period of time can be compared to predicted outcomes previously obtained. If the number of good outcomes increases, then the contact center can be said to be improving. If, on the other hand, the number of good outcomes decreases or the number of bad outcomes increases, the contact center may need to evaluate its practices and find ways to improve customer service, such as through further training or use of different plans in working with users.

In another embodiment, the contact center control system 142 analyzes whether the predicted outcome matches an actual outcome for the user. The actual outcome can be used to adjust or modify the predictive model, and/or a future predictive model, to make it more accurate in predicting outcomes.

Figure 4:
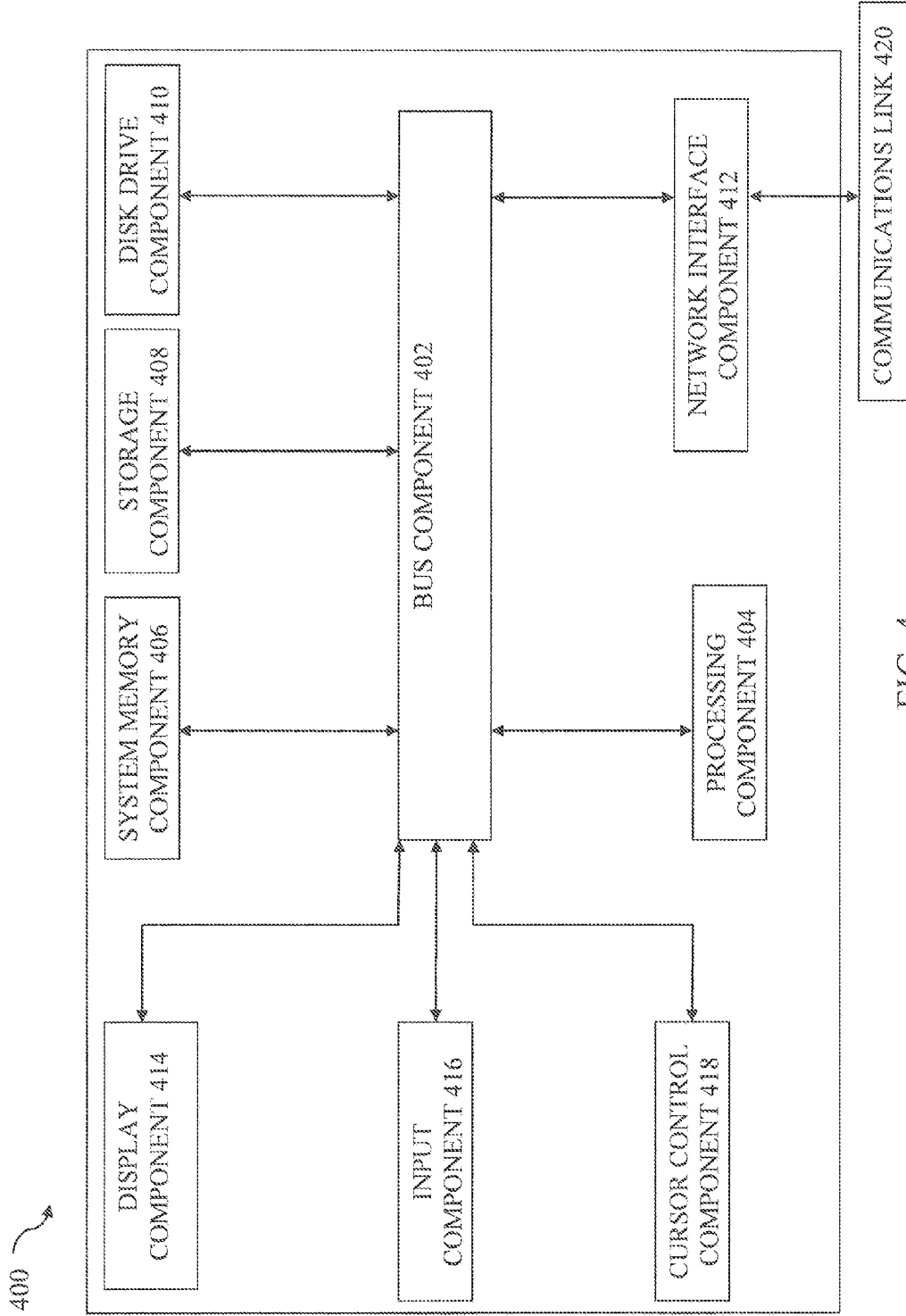
FIG. 4 is a block diagram of a computer system suitable for implementing a device according to one embodiment of the present disclosure.

Referring now to FIG. 4, illustrated is a block diagram of a system 400 suitable for implementing embodiments of the present disclosure, including contact center control system 142 and analytics system 160 depicted in FIG. 2. System 400, such as part of a computer and/or a network server, includes a bus 402 or other communication mechanism for communicating information, which interconnects subsystems and components, including one or more of a processing component 404 (e.g., processor, micro-controller, digital signal processor (DSP), etc.), a system memory component 406 (e.g., RAM), a static storage component 408 (e.g., ROM), a network interface component 412, a display component 414 (or alternatively, an interface to an external display), an input component 416 (e.g., keypad or keyboard), and a cursor control component 418 (e.g., a mouse pad).

In accordance with embodiments of the present disclosure, system 400 performs specific operations by processor 404 executing one or more sequences of one or more instructions contained in system memory component 406. Such instructions may be read into system memory component 406 from another computer readable medium, such as static storage component 408. These may include instructions to analyze video and audio components of a user communication, extract words from the audio component, extract emotions from the facial expressions in the video component, determine personality type of a user, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 404 for execution. Such a medium may take many forms, including but not limited to, non-volatile media, volatile media, and transmission media. In various implementations, volatile media includes dynamic memory, such as system memory component 406, and transmission media includes coaxial cables, copper wire, and fiber optics, including wires that comprise bus 402. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 400. In various other embodiments, a plurality of systems 400 coupled by communication link 420 (e.g., networks 102 or 104 of FIG. 1, LAN, WLAN, PTSN, or various other wired or wireless networks) may perform instruction sequences to practice the disclosure in coordination with one another. Computer system 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

In view of the present disclosure, it will be appreciated that various methods and systems have been described according to one or more embodiments for predicting user behavior based on analysis of a video communication.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow a quick determination of the nature of the technical disclosure. It is submitted with the understanding that it will not be used to interpret or limit the scope or meaning of the claims.

What is claimed is:

1. A video analytics system adapted to predict user behavior based on analysis of a video communication, which comprises:
    a node comprising a processor and a non-transitory computer readable medium operably coupled thereto, the non-transitory computer readable medium comprising a plurality of instructions stored in association therewith that are accessible to, and executable by, the processor, where the plurality of instructions comprises:
        instructions that, when executed, receive a video communication from a user, wherein the video communication comprises an audio component and a video component;
        instructions that, when executed, analyze the video component to provide time-coded video behavioral data from the user;
        instructions that, when executed, analyze the audio component to provide time-coded spoken words from the user;
        instructions that, when executed, associate the time-coded spoken words with the video behavioral data to determine an emotional state of the user;
        instructions that, when executed, collect biographical profile information specific to the user;
        instructions that, when executed, determine a personality type of the user by applying a linguistic-based algorithm to the spoken words, searching a density of keywords in the spoken words, and comparing the keywords to a library separated by different personality types; and
        instructions that, when executed, enter the collected biographical profile information, the emotional state, and the personality type into a predictive model, wherein the predictive model generates an indication of a likelihood of an outcome of the video communication.

2. The system of claim 1, wherein the outcome comprises one or more of whether a user will terminate his or her account, whether a user will purchase a product, whether a user is a fraudster, and whether a user will initiate additional subsequent interaction sessions regarding an issue.

3. The system of claim 1, wherein the video component includes a non-verbal, non-textual element comprising one or more of eye movement, facial expressions, gestures, activities, body postures, behaviors, attire, and actions.

4. The system of claim 1, wherein more than one user is speaking in the video communication.

5. The system of claim 4, wherein the audio and video components are analyzed simultaneously to determine which user is speaking.

6. The system of claim 1, which further comprises instructions, that when executed, identify attire of the user.

7. The system of claim 6, which further comprises instructions, that when executed, determine user value data based on estimated cost of the attire.

8. The system of claim 6, which further comprises instructions, that when executed, recommend items based on the attire of the user and display the items to an agent.

9. The system of claim 1, which further comprises instructions, that when executed, determine distress and engagement of the user.

10. The system of claim 9, wherein the distress and engagement are entered into the predictive model.

11. The system of claim 1, which further comprises instructions, that when executed, build the predictive model using previously-obtained emotional states and personality types of a plurality of different users.

12. The system of claim 11, wherein the emotional states are aggregated by personality types.

13. The system of claim 1, which further comprises instructions, that when executed:
    provide the indication of the outcome to an agent;
    determine, based at least in part on the indication of the likelihood of the outcome of the video communication, whether the agent should speak specific words, perform one or more specific actions, or both; and
    provide the agent with the specific words, the one or more specific actions, or both.

14. The system of claim 1, which further comprises instructions, that when executed:
    determine the likelihood of the outcome of the video communication should be increased or decreased;
    select a second agent for transferring the video communication to, wherein the transferring of the video communication to the second agent is determined, using at least the predictive model, to increase or decrease the likelihood of the outcome occurring; and
    transfer the video communication to the second agent.

15. A method to predict user behavior based on analysis of a video communication, which comprises:
    receiving, by one or more processors, a user video communication;
    extracting, by the one or more processors, video facial analysis data for the user from the video communication;
    extracting, by the one or more processors, voice analysis data including spoken words from the user video communication;
    associating, by the one or more processors, the video facial analysis data with the voice analysis data to determine an emotional state of the user;
    collecting, by the one or more processors, biographical profile information specific to the user;
    determining, by the one or more processors, a personality type of the user by applying a linguistic-based algorithm to the spoken words, searching a density of keywords in the spoken words, and comparing the keywords to a library separated by different personality types; and
    entering, by the one or more processors, the collected biographical profile information, the emotional state, and the personality type into a predictive model, wherein the predictive model generates an indication of a likelihood of an outcome of the video communication.

16. The method of claim 15, wherein the outcome comprises one or more of whether a user will terminate his or her account, whether a user will pay an outstanding bill, whether a user is a fraudster, and whether a user will initiate additional subsequent interaction sessions regarding an issue.

17. The method of claim 15, which further comprises analyzing the user's clothing and accessories.

18. The method of claim 17, which further comprises determining user value data based on the analysis of the user's clothing and accessories.

19. The method of claim 15, which further comprises generating time-coded distress and engagement data for the user.

20. The method of claim 19, which further comprises aggregating the time-coded distress and engagement data with the video facial analysis data and the voice analysis data.

21. The method of claim 15, which further comprises displaying the outcome to an agent and providing the agent with specific words, specific actions, or both.

22. The method of claim 15, which further comprises automatically sending an email with a special offer to the user based on the outcome.

23. The method of claim 15, which further comprises generating an agent performance score or generating agent training materials based on the outcome.

24. A non-transitory machine-readable medium comprising instructions which, in response to a computer system, cause the computer system to perform a method which comprises:
    receiving a user video communication;
    separating an audio component from a video component of the video communication;
    analyzing facial expressions of the user in the video component;
    transcribing words spoken of the user in the audio component;
    associating the facial expressions and spoken words to determine an emotional state of the user;
    collecting biographical profile information specific to the user;
    determining a personality type of the user by applying a linguistic-based algorithm to the spoken words, searching a density of keywords in the spoken words, and comparing the keywords to a library separated by different personality types; and
    entering the collected biographical profile information, the emotional state, and the personality type into a predictive model, wherein the predictive model generates an indication of a likelihood of an outcome of the video communication.

25. The non-transitory machine-readable medium of claim 24, wherein the method further comprises aggregating the facial expressions and spoken words of a plurality of different users by personality type.

26. The non-transitory machine-readable medium of claim 25, wherein the method further comprises building a predictive model based on the aggregated facial expressions, spoken words, and personality type.

27. The non-transitory machine-readable medium of claim 24, wherein the method further comprises identifying the attire of the user.

28. The non-transitory machine-readable medium of claim 27, wherein the method further comprises aggregating the identified attire with the facial expressions and spoken words from a plurality of users.

29. The non-transitory machine-readable medium of claim 24, wherein the method further comprises determining distress and engagement data of the user.

30. The non-transitory machine-readable medium of claim 29, wherein the method further comprises aggregating the distress and engagement data with the facial expressions and spoken words.

* * * * *